United States Patent [19]

Denmark

[11] Patent Number: 4,802,443
[45] Date of Patent: Feb. 7, 1989

[54] DOME SHAPED ANIMAL SHELTER

[75] Inventor: Henry M. Denmark, Raleigh, N.C.

[73] Assignee: DAMCO Plastics Corporation, Raleigh, N.C.

[21] Appl. No.: 103,521

[22] Filed: Oct. 1, 1987

[51] Int. Cl.$^4$ .............................................. A01K 1/02
[52] U.S. Cl. ................................................... 119/19
[58] Field of Search ................ 119/19, 121, 122, 51 R

[56] References Cited

U.S. PATENT DOCUMENTS

| | | | |
|---|---|---|---|
| 3,026,844 | 3/1962 | Spindler | 119/19 |
| 3,861,356 | 1/1975 | Kulka | 119/19 |
| 4,161,924 | 7/1979 | Welker | 119/19 |

*Primary Examiner*—Robert Peshock
*Attorney, Agent, or Firm*—Fred K. Carr

[57] ABSTRACT

This invention relates to a dome-shaped animal shelter having a separable housing and base. A swivel arm tether attachment is connected to the top of the housing providing an essentially tangle free tether where the animal can roam anywhere within a radius of the length of the tether. The shelter is anchored to the ground by a spiral anchor means. The separable housing and base are held together by a rim band when assembled, but are easily disassembled for cleaning or moving. In a preferred embodiment, the housing and base are made from reinforced plastic.

12 Claims, 3 Drawing Sheets

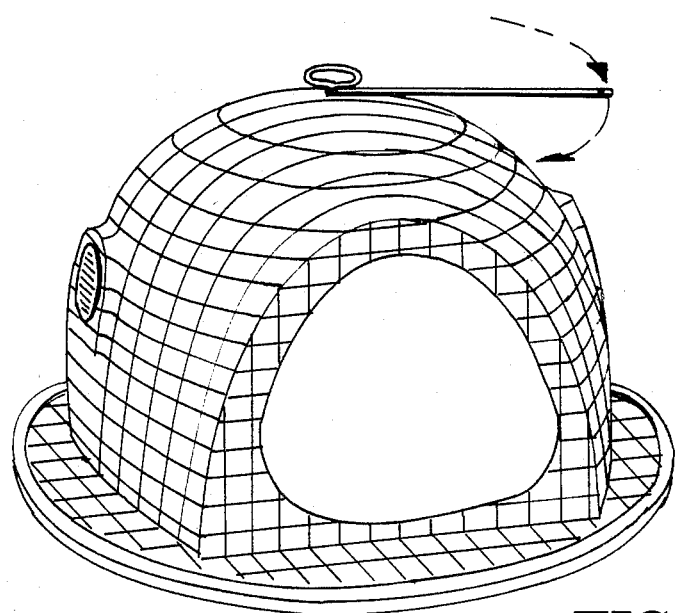
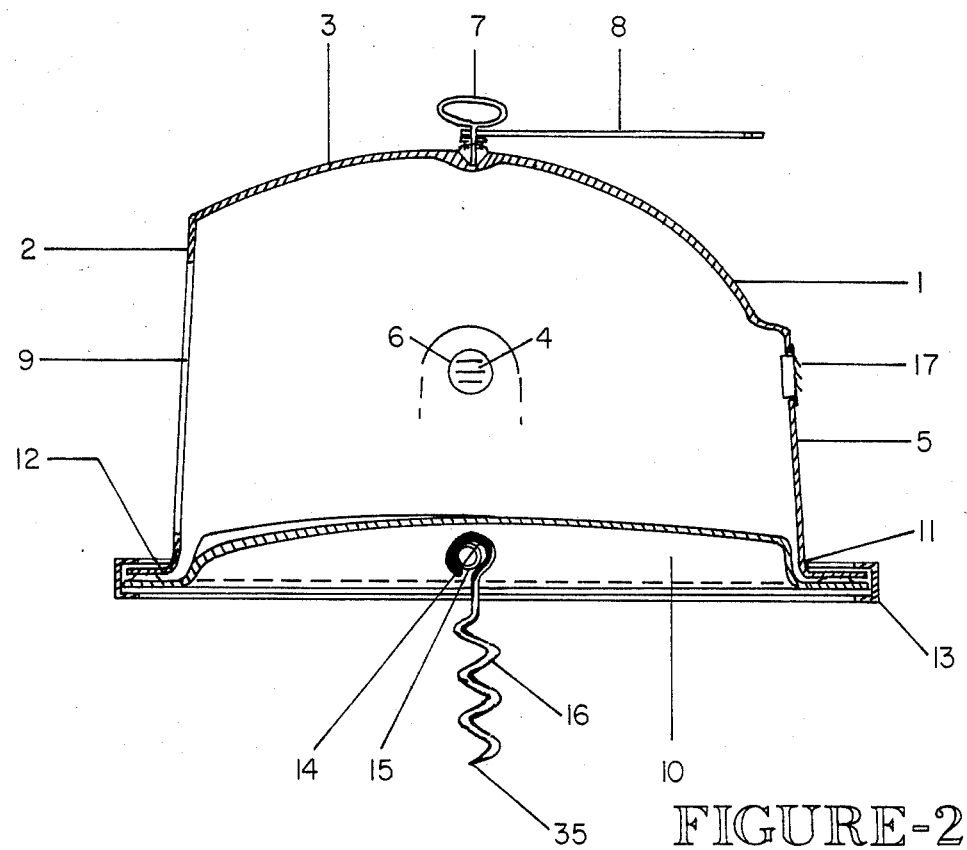

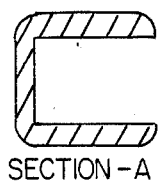
SECTION-A
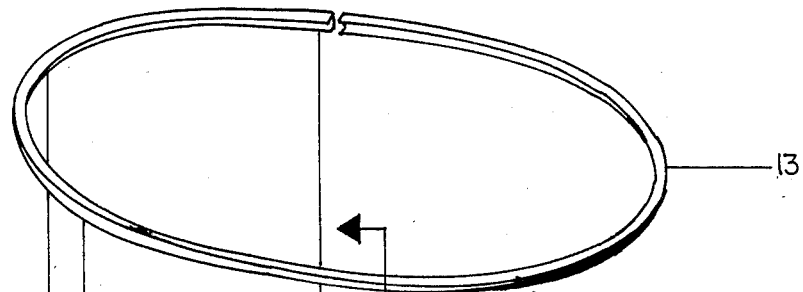
FIGURE-3
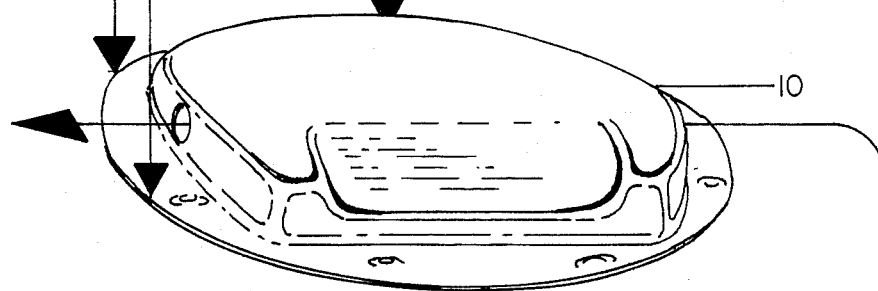
FIGURE-4
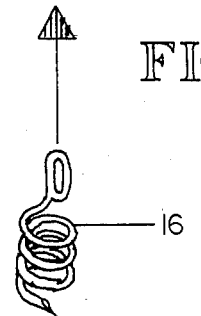
FIGURE-5
FIGURE-6

DOME SHAPED ANIMAL SHELTER

FIELD OF THE INVENTION

This invention relates to an animal shelter having a dome-shaped housing and a separable base for ease of assembling and disassembling. A swivel arm attachment at the top of the housing provides a means for tether attachment which is essentially tangle free for attaching the animal.

BACKGROUND OF THE INVENTION

In general, animal shelters have been heavy, difficult to move, and almost impossible to clean. Previous shelters will not accommodate a tether without tangling or restricting the range of movement of the animal. Dog shelters are often placed against another structure to prevent the dog from winding the chain or tether around the shelter. This, in effect, cuts in half the possible range of movement of the animal. The shape of the presently disclosed shelter in combination with a swivel arm on the top of the shelter allows the dog to roam anywhere within a radius of the length of the tether. The design of the presently disclosed swivel arm is simple yet efficient. Previously disclosed tether means, as in U.S. Pat. No. 4,161,924, consists of complicated mechanical devices including a track with trolley attachment.

Previously, animal shelters have been made from wood, or more recently, plastic material. Existing plastic material shelters have corners, ribs, or other protrusions which make them difficult to mold, manufacture, and ship. The present disclosure makes for ease in manufacturing and the shelters are stackable for shipping. In practice, a single mold is used to make the housing, and a single mold is used to make the base.

The shelter in this disclosure has a separable housing and base which are easily assembled and disassembled, permitting easy cleaning. The housing and base are held together by a rim band when assembled. When apart, a brush with a pail of water and soap can be used to scrub the shelter or it can be hosed down, keeping it virtually flea proof.

The shelter disclosed in this disclosure is anchored to the ground by a spiral anchor. This arrangement allows the shelter to be moved from place to place by unscrewing the anchor, moving the shelter, and rescrewing the anchor in the desired location.

SUMMARY OF THE INVENTION

The present invention relates to an animal shelter having a separable housing and base, being held together by a rim band when assembled. The shelter has a swivel arm on the top of the housing providing a tether attachment which allows the animal to roam anywhere within the radius of the length of the tether.

It is an object of the present invention to provide an animal shelter which is easily assembled and disassembled for cleaning.

It is a further object of this invention to provide a swivel arm tether attachment which is simple in design and essentially tangle free.

It is a further object of this invention to provide spiral anchor mechanism where in the shelter can be used as a stationary shelter but can be easily moved to another location.

It is a further object of this invention to provide a shelter simple in construction, made of light weight material, which can be nest stacked for shipping.

Other objects, features, and advantages of this invention will become apparent from reference to the detailed description of the invention which follows when taken together with the drawings, which are a part of this specification.

BRIEF DESCRIPTION OF THE DRAWINGS

FIG. 1 is a perspective view of a preferred embodiment of the animal shelter of this invention illustrating structure and swivel arm attachment.

FIG. 2 is a cross-sectional view of the animal shelter taken about center showing wall structure, swivel arm, and spiral anchor.

FIG. 3 is a top perspective view of the rim band.

FIG. 4 is a top perspective view of the base showing method of insertion for anchor bar.

FIG. 5 is a side perspective view of spiral anchor.

FIG. 6 is a side perspective view of anchor bar.

FIGS. 4, 5, and 6 taken together show method of anchoring the base to the ground.

DETAILED DESCRIPTION OF THE INVENTION

Figure 7:
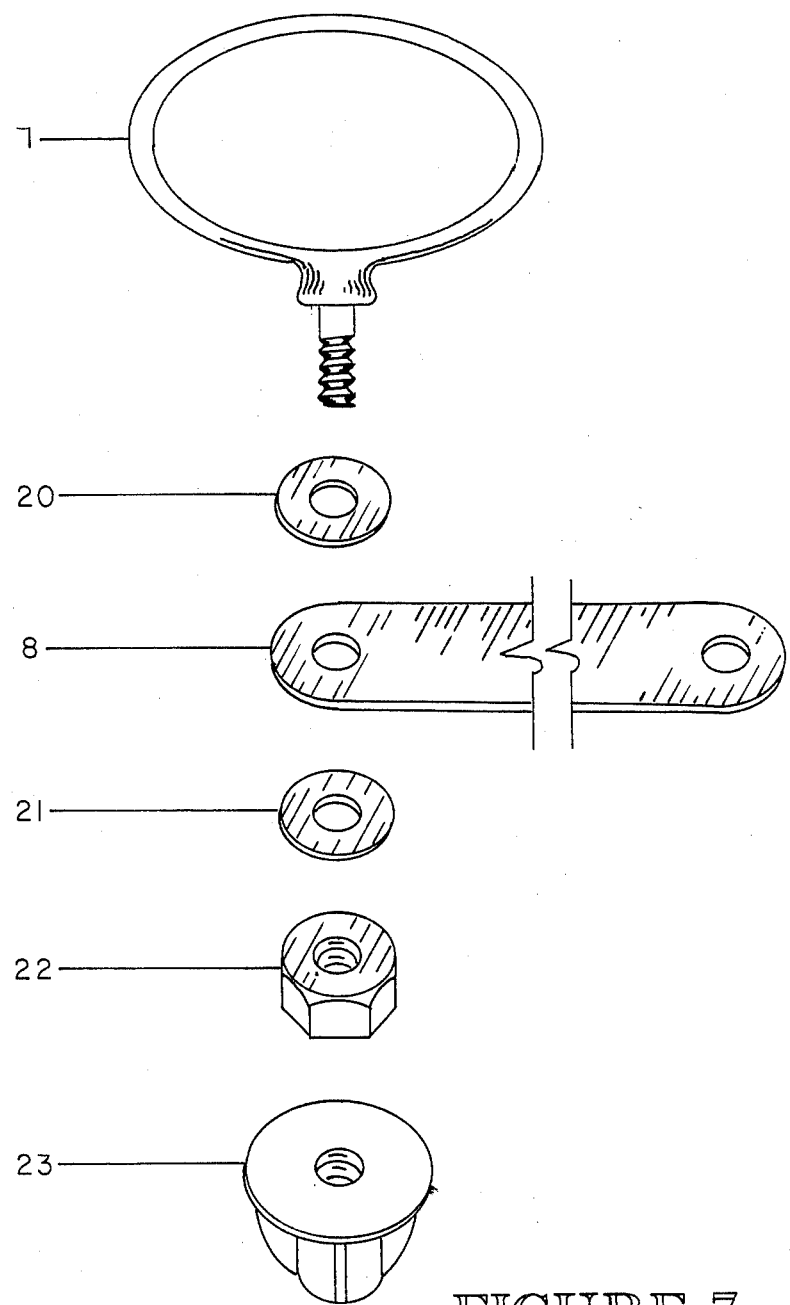
FIG. 7 is a sectional view of the swivel arm assembly.

Referring generally to FIGS. 1 and 2, there is shown an assembled animal shelter according to one embodiment of this invention. The shelter includes a housing (1) and a separable base (10). FIG. 1 is a front and top perspective view of the housing (1) which is generally dome shaped, having front (2) which is generally cathedral shaped. Front (2) is connected to back (5) by tapering surface (3). Front (2) has an opening or doorjam (9) for entering into the shelter. Vent (4) is placed on raised flat surface (6) on side of housing (1). Other vents, not shown, are on other side and back.

A swivel arm (8) is attached to the top of housing (1). In practice, a tether is connected at one end to swivel arm (8) and other end to a pet to restrain the pet within a radius of the shelter. The swivel arm provides a tangle free method of restraining the pet since there are no corners to intangle the tether.

Housing (1) sits on and is separately attached to base plate (10). As seen in FIG. 2, base plate (10) is slightly crowned shaped and sloped in the front toward the door (9). Base plate (10) is circular having flange (12) around outer periphery. The base of housing (1) is likewise circular, seen in FIG. 1, having peripheral flange (11). When the animal shelter is assembled, flange (11) of housing (1) sits on flange (12) of base plate (10), and the two are held together by locking rim band (13). Housing (1) and base plate (10) are designed such that when assembled together there exists a gap (26) between the two. Gap (26) allows any moisture or condensation to drain out.

Further reference to FIG. 2 shows spiral anchor (16) which, in practice, is screwed into the ground to anchor the shelter to the ground. Spiral anchor (16) has a loop (14) through which anchor rod (15) passes, best seen in FIG. 4. The spiral anchor holds base (10) securely in place when screwed into the ground, however, the shelter can be easily movable by disassembling housing (1) from base (10), unscrewing anchor (16), and reanchoring in a different location.

A cross-sectional view of housing (1) is best seen in FIG. 2. Front (2) is a flat surface having an opening for door (9). Back (5) is connected to front (2) by taping top (3). Housing (1) has an outwardly extending flange (11) around entire housing. In a preferred embodiment, there are three vents for ventilation. Vent (4) is located on one side wall, vent (17) is located on back wall, and another vent, not seen, is located on other side wall. Side wall vents (4) are placed on a raised flat surface (6). A hinged door can be placed in opening (9).

FIG. 4 is a top perspective view of base (10). Base (10) has a slightly crown shaped internal area (30), downwardly extending wall (31), and peripheral flange (12) extending outwardly from wall (31) around entire base (10). Internal area (30) has a downwardly sloped section (32) at front for drainage. When the shelter is assembled, downwardly sloped section (32) is located at door (9). Wall (31) has hold (33), with another hole, not shown, on opposite side wall. Anchor bar (15) is inserted in holes when shelter is assembled.

FIG. 5 is a perspective view of spiral anchor (16). Spiral anchor (16) has loop (14) at its top. Anchor bar (15) passes through loop (14) for assembling the shelter. Spiral anchor (16) has sharp tip (35) for screwing into the ground.

FIG. 6 is a side perspective view of anchor bar (15). Anchor bar (15) corresponds in size and length to holes (33) in base wall (31). When assembled, the placement of housing (1) prevents bar (15) from sliding out of holes (33).

FIG. 3 is a top perspective view of rim band (13). In a preferred embodiment, rim band (13) is used to connect housing (1) to base (10). Rim band (13) is generally U-shaped in cross-section such as to fit over peripheral flange (11) of the housing (1) and flange (12) of the base (10) to hold the two together. Rim band (13) is generally made from flexible plastic such that it can be bent when placing on. In alternate embodiment, housing (1) could be attached to base (10) by other means including bolt connections on latch connections.

Referring to FIGS. 3, 4, 5, and 6, the shelter is secure to the ground and assembled by the following procedures. Spiral anchor (16) is screwed into the ground to the point where the bottom of loop (14) is approximately even with the ground. Anchor bar (15) can be used during this procedure by inserting the bar into loop (14) for leverage. After the spiral anchor (16) is in place, base (10) is centrally placed over anchor (16) such that holes (33) are in alignment with loop (14). Anchor bar (15) is then inserted in hole (33), through loop (14), and finally through other hole on opposite side of wall (31), thereby securely anchoring base (10) to the ground. Housing (1) is then placed on base (10) such that door (9) of housing (1) is in alignment with sloping section (32) of base (10). Rim band (13) is then placed around peripheral flange (12) of base (10) and peripheral flange (11) of housing (1) holding the two together.

FIG. 7 is a perspective view of the swivel arm (8) and its attachment to housing (1). The swivel arm assembly includes handle (7), washer (20), swivel arm (8), washer (21), nut (22), and threaded insert (27). Handle (7) provides a convenient method for carrying housing (1) when the shelter is disassembled. Handle (7) has threaded bolt (19) which passes through washer (20), hole (24) in swivel arm (8), washer (21), and is thereafter fastened by nut (22). Bolt (19) is designed such that threaded part extends through bolt (22), and the threaded extension is then inserted into threaded slot (27). Bolt (19) is then tightened against insert (27). This arrangement allows swivel arm (8) to rotate freely around the housing (1). The tether is attached to hole (25) of swivel arm (8).

The attachment of swivel arm assembly to housing (1) is best seen in FIG. 2. The assembly is attached at the uppermost section of housing (1). Threaded insert (23) is securely connected to top of housing (1), such that there is no leakage at the connection.

The shelter may be made of materials such as reinforced plastic, fiberboard, metal, or the like. A preferred embodiment of this invention is composed of fiberglass reinforced urea based plastic. The size of the shelter may vary, depending on the size of the animal to be housed, and it may also be of different colors.

In the manufacturing process, it is desirable to have a separate mold for the housing (1) and base (10). In a preferred embodiment, the housing (1) and base (10) are composed of the same material, reinforced plastic. The openings for the door (9) and vents (4, 17) can be part of the mold, or these can be cut out after the plastic hardens.

Rim band (13) is made of a flexible material such that it can be put on and taken off with ease. In a preferred embodiment, it is made of flexible plastic.

The above described invention relates to an animal shelter and method thereof. While the invention has been described in the manner presently conceived to be most practical and preferred embodiment thereof, it will be apparent to persons ordinarily skilled in the art that modifications may be made thereof within the scope of the invention, which scope is to be accorded the broadest interpretation of the claims such as to encompass all equivalents, devices, and methods.

What is claimed is:

1. An animal shelter comprising:
   a. a substantially dome-shaped housing having an opening for a door;
   b. a separable base providing a floor for said housing;
   c. means for attaching said housing to said base;
   d. a swivel arm means attached at top of said housing;
   e. a tether attached to said arm;
   f. a spiral anchor means for anchoring said base to the ground, said means including a spiral anchor placed in the ground, said anchor having a loop at the top, an anchor bar held horizontally in place along center line of bottom of said base by holes located on opposite sides of said base, where said bar is placed through said loop of said anchor while being placed in said holes of said base, thereby holding the shelter in place.

2. A shelter as recited in claim 1, further comprising: circular peripheral flanges on said housing and said base providing means for attaching said housing to said base.

3. A shelter as recited in claim 2, wherein: said housing and said base are held together by rim band.

4. A shelter as recited in claim 1, wherein: said housing and base are made of plastic material.

5. A shelter as recited in claim 4, wherein: said plastic is reinforced with fiberglass material.

6. A shelter for animals comprising:
   a. a substantially dome-shaped housing with opening for door having circular bottom with flange extending outwardly;
   b. a separable circular base with downwardly offset peripheral flange, said base forming floor of the shelter;
   c. means for connecting said housing to said base;
   d. a swivel arm attachment on top of said housing with tether;

e. a spiral anchor means for securing said base to the ground including a spiral anchor placed in the ground, said anchor having a loop at the top, an anchor bar held horizontally in place along center line of bottom of said base by holes located on opposite sides of said base, where said bar is placed through said loop of said anchor while being placed in said holes of said base, thereby holding the shelter in place.

7. A shelter as recited in claim 6, wherein: said base includes peripheral flange providing support for said shelter and raised internal area providing floor for said shelter.

8. A shelter as recited in claim 7, wherein: said raised floor has downwardly sloped section at front for drainage.

9. A shelter as recited in claim 6, wherein: said means for connecting said housing said base is by rim band.

10. A shelter as recited in claim 6, wherein: said means for connecting said housing to said base is by bolt means.

11. A shelter as recited in claim 6, further comprising: at least one vent for ventilation.

12. A shelter as recited in claim 6, further comprising: a door hinged in said opening.

* * * * *